Jan. 21, 1969        A. F. GAGE        3,422,937
BRAKE SHOE AND LINING THEREFOR
Filed Oct. 6, 1967
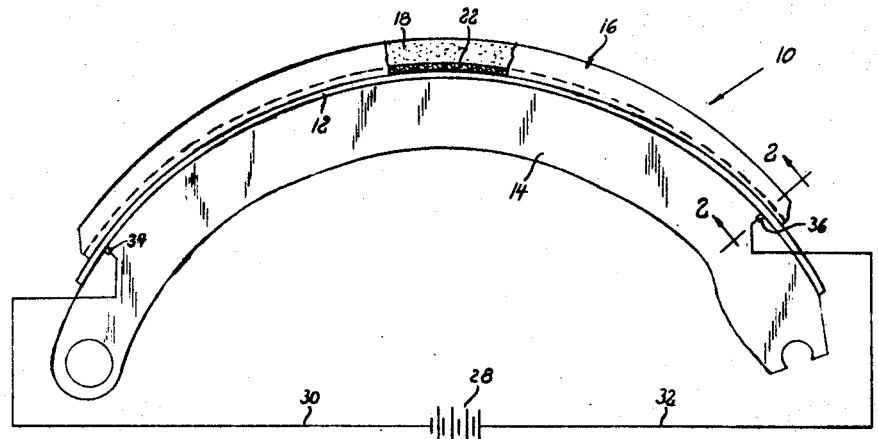
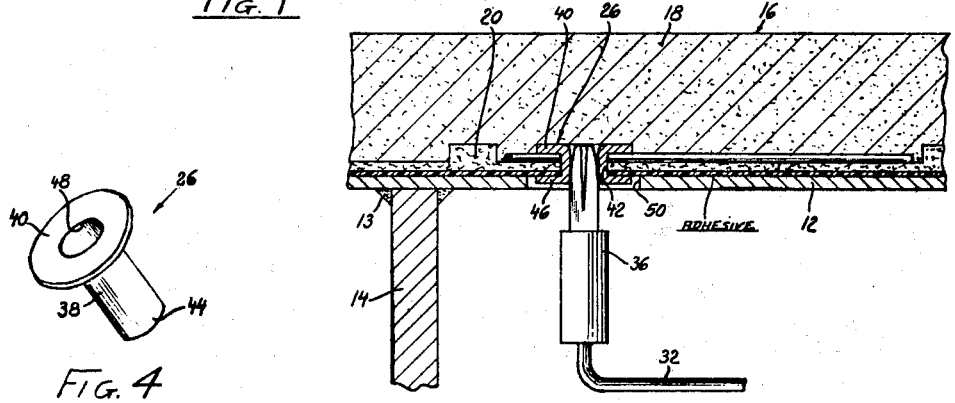
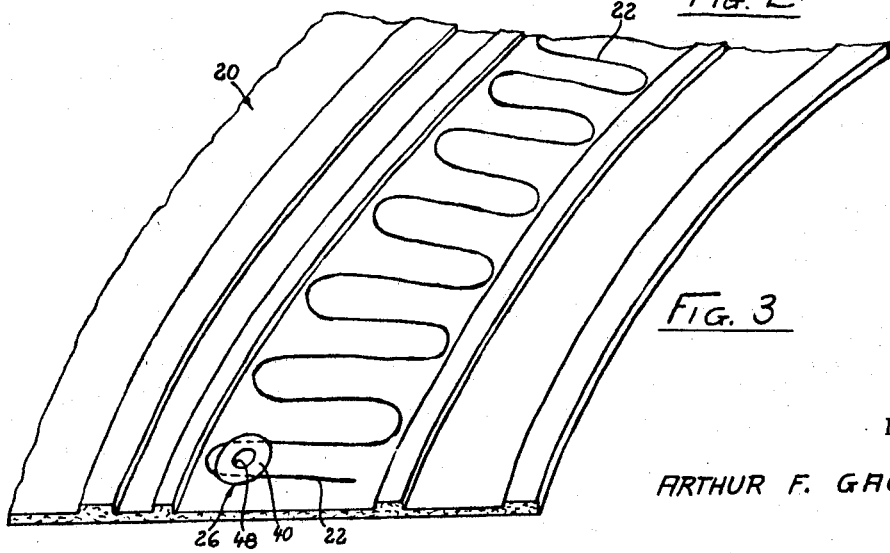
INVENTOR
ARTHUR F. GAGE
BY JOHN R. BRONAUGH
ATTORNEY

United States Patent Office 3,422,937
Patented Jan. 21, 1969

3,422,937
BRAKE SHOE AND LINING THEREFOR
Arthur F. Gage, Warren, Mich., assignor, by mesne assignments, to Rockwell-Standard Company, Pittsburgh, Pa., a corporation of Delaware
Filed Oct. 6, 1967, Ser. No. 673,438
U.S. Cl. 188—250          5 Claims
Int. Cl. F16d *19/00;* F16d *65/04;* F16d *11/00*

ABSTRACT OF THE DISCLOSURE

A brake shoe and composite brake lining therefor in which the lining is bonded to the platform of the brake shoe by a thermally responsive adhesive in which an electrical heating element is interposed between the friction material and the adhesive and in which socket type electrical terminals are provided to permit electrical connection of the heating element to an external source of electrical energy.

Background and summary of invention

This is an improvement over the brake shoe and brake shoe lining structure disclosed in my co-pending United States application Ser. No. 519,714, filed Jan. 10, 1966, now Patent No. 3,348,641, for "Brake Shoe Lining with Incorporated Heating Element."

The primary object of this invention is to provide an improved brake shoe and brake shoe lining with incorporated heating element therefore in which electrical connections can be readily made to the incorporated heating element for both bonding and debonding of the lining relative to the brake shoe platform.

Specifically, it is an object of the present invention to provide for such a brake shoe and brake shoe lining electrical socket connectors extending from the exterior of and through the adhesive material into electrical contact with the heating element which socket connectors are readily accessible through the brake shoe platform so that an external source of electrical energy can be connected to the heating element by being plugged into the socket elements through the platform without electrical connection to the platform.

These and other objects of the present invention will become more fully apparent by reference to the appended claims as the following detailed description proceeds and reference to the accompanying drawings.

Description of drawings

FIGURE 1 is a side elevational view of a brake shoe constructed in accord with the present invention diagrammatically illustrating the connection of the electrical heating element thereof to a source of electrical energy;

FIGURE 2 is a fragmentary sectional view taken substantially along the line 2—2 of FIGURE 1;

FIGURE 3 is a fragmentary perspective view illustrating the relation of the heating element, heating element terminal sockets, and internal backup member with the friction material member removed; and FIGURE 4 is a perspective view of the electrical connector socket prior to its assembly with the backup member and heating element as illustrated in FIGURES 2 and 3.

Preferred embodiment

Referring now to the drawings, and particularly to FIGURE 1, the brake shoe and lining assembly 10 comprises an arcuate metal platform 12 attached as by welding at 13 to and supported by at least one longitudinally extending web 14, and the composite lining 16.

As is more fully described in the aforesaid co-pending application, the composite brake lining is of the type that is bonded by a heat responsive adhesive to the arcuate metal brake shoe platform 12, consisting essentially of an outer friction material member 18, a separate preformed internal solid background member 20 molded in assembly together with the friction material member 18, an electrical heating element 22 preferably of sinuous form, as illustrated in FIGURE 3 and extending longitudinally through the entire arcuate length of the brake shoe lining assembly 16 between the friction material member and the backup member, and a pair of externally accessible terminals 26 for said heating element preferably disposed at opposite ends of the lining assembly 16. For bonding the assembly 16 to the brake shoe platform 12 or for debonding the lining 16 from the brake shoe platform 12, electrical connection is made to the heating element 22 through the terminals 26 from a suitable source of electrical energy 28 via lead wires 30 and 32 and plugged in plug type connectors 34 and 36.

The terminals 26 are of identical construction and identically connected to the heating element 22.

Referring now to FIGURES 2 and 4 the terminal 26 is a tubular socket member having a cylindrical central portion 38 terminating in one end in a radially extending flange 40. In assembly as shown in FIGURE 2, the flange 40 overlies and is in a direct electrical contact with the exposed wire of the heating element 22. The cylindrical portion 38 is inserted through an aligned aperture 42 in the backing member 20 and its end 44 is thereafter rivited flattened to assume the form illustrated in FIGURE 2 to provide a further radial flange 46 (FIGURE 2). The heating element 22 and backing member 20 are thus retained between the radial flanges 40 and 46. The terminal 26 has a central through aperture 48 into which the plugged connector 34 or 36 may be inserted, as illustrated in FIGURE 2, to establish an electrical connection via the lead wire 30 and 32 from the source 28.

The platform 12 is formed with a through aperture 50 of greater diameter than the diameter of the radial flange 46 to preclude electrical contact between the flange 46 and the platform 12 and to permit insertion of the plug 36 into the socket formed by the connector 26 without contact with the platform 12 to prevent a short circuit.

By the foregoing arrangement, the necessary electrical connections from an external source 28 to the heating element 22 for bonding or debonding the lining assembly 16 relative to the metal brake shoe platform 12 in the manner described in my aforesaid co-pending application can be readily made. As a result, it is possible to remove and replace worn brake shoe linings, utilizing equipment normally available in repair shops.

The invention may be embodied in other specific forms without departing from the spirit or essential characteristics thereof.

I claim:

1. A composite brake lining of the type that is bonded with a heat responsive adhesive to a metal brake shoe platform having an outer friction material member, a separate preformed internal solid backup member molded together in assembly, an electrical heating element extending longitudinally between said members, and externally accessible terminals for said element, an improvement wherein said terminals are metallic electrically conducive sockets inbedded in said lining, extending from the exterior surface of said backup member through said backup member into electrical contact with said electrical heating element.

2. The brake lining defined in claim 1 wherein said socket comprises a tubular metallic member extending through said backup member from the external surface thereof toward said friction material member, having a radial flange at the end thereof intermediate said friction material member and said backup member overlying an adjacent portion of and in electrical contact with said electrical heating element.

3. The brake lining defined in claim 2 wherein said tubular member has a radial flange overlying the exposed base of said backup member whereby said heating element and said backup member are retained between the flanges at the opposite ends of said tubular member.

4. A brake shoe comprising a rigid arcuate lining platform and a composite brake lining adhesively secured on the convex base of said platform, said lining consisting essentially of an outer friction material member, a separate preformed internal solid backup member molded together in assembly with said friction material member, an electrical heating element extending longitudinally between said friction material member and said backup member and externally accessible terminals for said heating element, the improvement wherein said terminals comprise a pair of metallic sockets extending through said backup member into electrical contact with said electrical heating element and wherein said platform is apertured in alignment with each of said sockets whereby said heating element may be connected to a source of electrical energy by plugging in contacts inserted into said sockets through said platform apertures.

5. The brake shoe defined in claim 4 wherein said sockets are electrically isolated from said platform to preclude electrical current flow between said sockets through said platform and parallel with said electrical heating element.

References Cited

UNITED STATES PATENTS 3,348,640 10/1967 Thompson et al. _____ 188—250
3,348,641 10/1967 Gage _____ 188—250

GEORGE E. A. HALVOSA, *Primary Examiner.*

U.S. Cl. X.R.

188—234; 192—107; 156—275

UNITED STATES PATENT OFFICE
CERTIFICATE OF CORRECTION

Patent No. 3,422,937                              January 21, 1969

Arthur F. Gage

It is certified that error appears in the above identified patent and that said Letters Patent are hereby corrected as shown below:

Column 1, line 31, "therefore" should read -- therefor --. Column 2, line 5, "background" should read -- backup --; line 9, "through" should read -- throughout --. Column 3, line 1, before "overlying" insert -- and --.

Signed and sealed this 17th day of March 1970.

(SEAL)
Attest:

Edward M. Fletcher, Jr.                       WILLIAM E. SCHUYLER, JR.
Attesting Officer                                       Commissioner of Patents